(12) United States Patent
Kotake et al.

(10) Patent No.: US 10,680,667 B2
(45) Date of Patent: Jun. 9, 2020

(54) RECEPTION DEVICE AND COMMUNICATION SYSTEM

(71) Applicant: Mitsubishi Electric Corporation, Tokyo (JP)

(72) Inventors: Hiroaki Kotake, Tokyo (JP); Masahiro Ishihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/477,980

(22) PCT Filed: Mar. 22, 2017

(86) PCT No.: PCT/JP2017/011545
§ 371 (c)(1),
(2) Date: Jul. 15, 2019

(87) PCT Pub. No.: WO2018/173173
PCT Pub. Date: Sep. 27, 2018

(65) Prior Publication Data
US 2020/0127691 A1 Apr. 23, 2020

(51) Int. Cl.
*H04B 1/10* (2006.01)
*H04B 1/16* (2006.01)

(52) U.S. Cl.
CPC ............... *H04B 1/10* (2013.01); *H04B 1/16* (2013.01)

(58) Field of Classification Search
CPC .................................... H04B 1/62; F24F 11/88
See application file for complete search history.

(56) References Cited

U.S. PATENT DOCUMENTS

| 5,488,565 A | * | 1/1996 | Kennon | G01R 22/066 307/132 EA |
| 2011/0242716 A1 | * | 10/2011 | Ueta | H02H 3/087 361/79 |
| 2016/0327304 A1 | | 11/2016 | Tsuji et al. | |
| 2018/0019787 A1 | | 1/2018 | Kotake et al. | |

FOREIGN PATENT DOCUMENTS

| JP | 2006-129276 A | 5/2006 |
| JP | 4419592 B2 | 2/2010 |
| JP | 2012-151579 A | 8/2012 |
| WO | 2016/157472 A1 | 10/2016 |

OTHER PUBLICATIONS

Extended European Search Report dated Jan. 28, 2020 issued in corresponding EP patent application No. 17902549.9.

* cited by examiner

*Primary Examiner* — Kevin Kim
(74) *Attorney, Agent, or Firm* — Posz Law Group, PLC

(57) ABSTRACT

A voltage application circuit including a photocoupler and a resistor applies, to a reception terminal, a voltage corresponding to an intensity of a communication current flowing through a transmission path. A reception control unit determines whether the communication current is flowing, by comparing the voltage applied to the reception terminal with a predetermined voltage threshold. A voltage adjustment circuit including a resistor and a transistor adjusts the voltage that is applied to the reception terminal by the voltage application circuit. A switch control unit switches a current threshold used for determining whether the communication current is flowing by controlling the voltage adjustment circuit in accordance with an intensity of the communication current during an on-control period.

14 Claims, 10 Drawing Sheets

FIG. 5

| CURRENT THRESHOLD | FIRST SWITCH SIGNAL | SECOND SWITCH SIGNAL | LOAD RESISTANCE FOR PHOTOTRANSISTOR 142 |
|---|---|---|---|
| FIRST CURRENT THRESHOLD | L LEVEL | H LEVEL | RESISTOR 145 |
| SECOND CURRENT THRESHOLD | H LEVEL | L LEVEL | RESISTOR 144 |
| THIRD CURRENT THRESHOLD | L LEVEL | L LEVEL | PARALLEL COMBINED RESISTANCE OF RESISTORS 144 AND 145 |

RECEPTION DEVICE AND COMMUNICATION SYSTEM

CROSS REFERENCE TO RELATED APPLICATION

This application is a U.S. national stage application of International Patent Application No. PCT/JP2017/011545 filed on Mar. 22, 2017, the content of which is incorporated herein by reference.

TECHNICAL FIELD

The present disclosure relates to a reception device and a communication system.

BACKGROUND

A known air-conditioning system includes multiple air conditioners interconnected through a three-core cable including a power source line, a communication line, and a common line. The three-core cable allows power supply and communication. Such an air-conditioning system allows communication through a current loop that is a communication scheme for transmitting signals based on changes in a communication current. In this system, for example, the communication line, the common line, and a power source circuit included in an outdoor unit of the air conditioners are connected in series to form a transmission path through which a communication current flows. Each of the air conditioners includes a transmission circuit that controls turning-on and turning-off (passage and stop) of a communication current, and a reception circuit that detects a communication current.

For a long (e.g., 100 m or more) three-core cable, noise may occur in the communication line due to the large capacitance between the lines, and interfere with normal communication. In response to this, techniques have been developed for protecting normal communication against noise. For example, Patent Literature 1 describes a technique for improving the noise resistance by installing a resistor in parallel with the light-emitting device of a reception photocoupler included in a reception circuit The resistor increases the current threshold for communication current detection. The resistance of the resistor is determined in accordance with the communication current intensity during an on-control period. The communication current intensity during the on-control period is defined using the circuit parameters such as the resistance of a resistor on the transmission path and the power source voltage of the power source circuit.

PATENT LITERATURE

Patent Literature 1: Unexamined Japanese Patent Application Kokai Publication No. 2006-129276

However, the circuit parameters used with the technique described in Patent Literature 1 may be changed when an air conditioner included in an air-conditioning system is replaced. In such a case, the resistance of the resistor becomes inappropriate, turning the current threshold into an inappropriate value. After the circuit parameters are changed, the technique described in Patent Literature 1 may lower noise resistance and disable normal communication. A technique is to be developed for increasing the noise resistance in a communication system that uses a current loop.

One or more aspects of the present disclosure are directed to a reception device and a communication system that have high noise resistance.

SUMMARY

A reception device according to one aspect of the present disclosure is connectable to a transmission device with a pair of communication lines included in a transmission path. The transmission device is for controlling a turning-on and turning-off of a communication current flowing through the transmission path. The reception device includes a voltage application circuit configured to apply, to a reception terminal, a voltage corresponding to an intensity of the communication current, determination means for determining whether the communication current is flowing, by comparing the voltage applied to the reception terminal with a predetermined voltage threshold, a voltage adjustment circuit configure to adjust the voltage that is to be applied to the reception terminal by the voltage application circuit, and threshold switch means for switching a current threshold used for determining whether the communication current is flowing by controlling the voltage adjustment circuit in accordance with an intensity of the communication current during an on-control period.

The reception device and the communication system according to the above aspect of the present disclosure switch the current threshold for communication current detection in accordance with the communication current intensity during the on-control period, and thus increase noise resistance.

BRIEF DESCRIPTION OF DRAWINGS

FIG. 5 is a diagram showing the relationship between current thresholds and switch signal levels;

DETAILED DESCRIPTION

Embodiment 1

Figure 1:
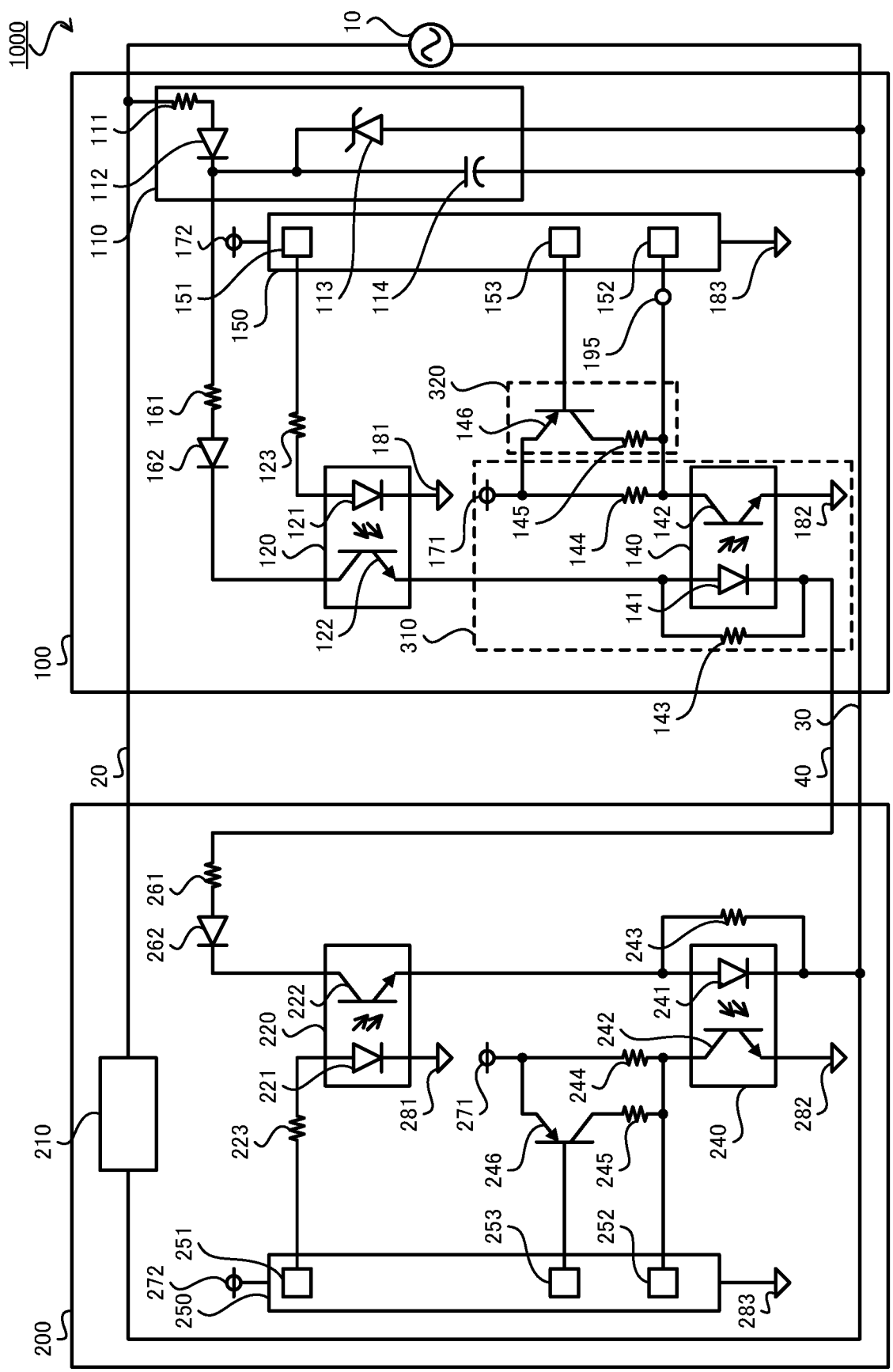
FIG. 1 is a schematic diagram of a communication system according to Embodiment 1 of the present disclosure.

The structure of a communication system 1000 according to Embodiment 1 of the present disclosure will now be described with reference to FIG. 1. As shown in FIG. 1, the communication system 1000 includes a communication device 100 and a communication device 200. In the present embodiment, the communication system 1000 is an air-conditioning system, the communication device 100 is an outdoor unit, and the communication device 200 is an indoor unit. The communication device 100 is a transmission device that transmits data to the communication device 200, and is also a reception device that receives data from the communication device 200. The communication device 200 is a transmission device that transmits data to the communication device 100, and is also a reception device that receives data from the communication device 100. The communication device 100 and the communication device 200 are interconnected through a three-core cable including a power source line 20, a common line 30, and a communication line 40, and communicate with each other through a current loop. The current loop is a communication scheme for transmitting signals based on changes in a communication current.

The communication device 100 and the communication device 200 operate on alternating-current (AC) power fed from an AC power source 10. The communication device 100 receives AC power from the AC power source 10 through the power source line 20 and the common line 30. For example, the AC power source 10 feeding AC power is a commercial power source that outputs a voltage of 200 V. The power source line 20 is, for example, a power line set at a power source potential (live potential). The common line 30 is a power line that is set at a reference potential (neutral potential) to the AC power source 10 and a direct-current (DC) power source 110 and returns communication current from the communication device 200 to the communication device 100. The common line 30 functions as a power source line and a communication line. The communication line 40 is a power line that passes communication current fed from the DC power source 110, from the communication device 100 to the communication device 200. The communication device 200 receives AC power from the communication device 100 through the pair of power source lines (the power source line 20 and the common line 30). The communication device 100 and the communication device 200 are interconnected through the pair of communication lines (the common line 30 and the communication line 40).

A technique for transmitting data through serial communication using a communication current will now be described. The communication current flows in the transmission path through the communication device 100, the communication line 40, the communication device 200, the common line 30, and the communication device 100 in this order. The transmission path thus includes the pair of communication lines (the common line 30 and the communication line 40) connected in series. Data transmitted through serial communication is represented by a binary number defined by a combination of 1 and 0. To transmit data from the communication device 100 to the communication device 200, the communication device 100 passes or stops a communication current at each predefined reference cycle based on the data to be transmitted.

For example, the communication device 100 passes a communication current to transmit 1 or stops a communication current to transmit 0. A passing communication current indicates transmission of 1, whereas a stopped communication current indicates transmission of 0. The communication device 100 turns on a photocoupler 120 to pass a communication current or turns off the photocoupler 120 to stop the communication current. While the communication device 100 is transmitting data, the communication device 200 turns on a photocoupler 220 to allow passage of a communication current through the transmission path.

The communication device 200 detects the state of a photocoupler 240 in each reference cycle to determine whether a communication current is flowing. The communication device 200 then recognizes the binary data indicating whether a communication current is flowing as data transmitted by the communication device 100. The logics indicated by 0 and 1 may be reversed as appropriate. The transmission path on which a communication current is flowing is referred to as the transmission path in a conducting state, whereas the transmission path on which a communication current is stopped is referred to as the transmission path in a nonconducting state. The conducting/nonconducting state of the transmission path means either the conducting state or the nonconducting state. The conducting state may be referred to as an on-state, and the nonconducting state may be referred to as an off-state. The period during which the state is controlled to be conducting may be referred to as an on-control period or a power-on period. The period during which the state is controlled to be nonconducting may be referred to as an off-control period or a power-off period.

To transmit data from the communication device 200 to the communication device 100, the communication device 200 passes or stops a communication current in each reference cycle based on the data to be transmitted. In other words, the communication device 200 turns on or off the photocoupler 220. The communication device 100 detects the state of a photocoupler 140 in each reference cycle to determine whether a communication current is flowing. The communication device 100 recognizes the binary data indicating whether a communication current is flowing as data transmitted by the communication device 200. While the communication device 200 is transmitting data, the communication device 100 keeps the photocoupler 120 on to allow the passage of the communication current through the transmission path.

In the present embodiment, the power source line 20, the common line 30, and the communication line 40 are tied in a single cable. The cable thus has a non-negligible capacitance between the power source line 20, the common line 30, and the communication line 40. An alternating current flowing through the power source line 20 and the common line 30 may cause noise, and the noise may reach the communication line 40. For a noise-carrying communication current flowing through the communication line 40 as well, a current threshold for determining whether a communication current is flowing is to be set appropriately to prevent the reception device from erroneously determining whether the communication current is flowing. For example, the current threshold may be about half the communication current intensity. In this case, positive voltage noise produced when no communication current is flowing cannot easily cause erroneous determination that a communication current is flowing. In contrast, negative voltage noise produced when a communication current is flowing cannot easily cause erroneous determination that no communication current is flowing.

However, the communication current intensity depends on the circuit parameters such as the resistance of a resistor on the transmission path and the power source voltage of the DC power source 110 for generating a communication current. To set the current threshold appropriately, the circuit parameters during communication may be obtained, and the current threshold may be switched appropriately in accordance with the obtained circuit parameters. In the present embodiment, the reception device receives data including the circuit parameters from the transmission device, and switches the current threshold based on the received circuit parameters and circuit parameters for the reception device.

The reception device generates voltage corresponding to the communication current intensity, and detects a communication current in accordance with whether the generated voltage exceeds a voltage threshold. Switching the voltage threshold can switch the current threshold. However, the voltage threshold may be a fixed value in the hardware and cannot be switched easily. The reception device thus switches the current threshold by switching the level of the voltage generated in accordance with the communication current intensity. The present embodiment describes a method for switching the resistance between a power terminal and a reception terminal that receives the voltage to be compared with the voltage threshold to switch the voltage applied to the reception terminal.

The structure of the communication device 100 will now be described. As shown in FIG. 1, the communication device 100 includes the DC power source 110, the photocoupler 120, a resistor 123, the photocoupler 140, a resistor 143, a resistor 144, a resistor 145, a transistor 146, a controller 150, a resistor 161, a diode 162, a power terminal 171, a power terminal 172, a ground terminal 181, a ground terminal 182, a ground terminal 183, and a reception terminal 195.

The DC power source 110 feeds a communication current. The DC power source 110 receives AC power fed from the AC power source 10 through the power source line 20 and the common line 30, and converts the received AC power into DC power. The DC power source 110 generates power source voltage for communication with respect to the potential of the common line 30. The DC power source 110 is a half-wave rectifier circuit including a resistor 111, a diode 112, an electrolytic capacitor 114, and a zener diode 113.

The photocoupler 120 is an element that electrically insulates two circuits from each other. The photocoupler 120 electrically insulates the circuit connected to the AC power source 10 and the transmission path from the circuit connected to the microcomputer that is the controller 150. The photocoupler 120 includes a light emitting diode 121 and a phototransistor 122. When a current flows through the light emitting diode 121, a current flows through the current path of the phototransistor 122.

When the value of the voltage across the light emitting diode 121 reaches or exceeds a threshold, a current flows and the light emitting diode 121 emits light. The light emitting diode 121 has the anode connected to a transmission control unit 151 via the resistor 123, and the cathode to the ground terminal 181. The phototransistor 122 passes a current corresponding to the voltage across the phototransistor 122 and the light intensity of the light emitting diode 121 from the collector to the emitter of the phototransistor 122. The phototransistor 122 is arranged on the transmission path. The phototransistor 122 has the collector connected to the cathode of the diode 162, and the emitter to the anode of a light emitting diode 141. The resistor 123 is a load resistor that limits a current flowing from the transmission control unit 151 to the light emitting diode 121.

The photocoupler 120 transmits data by controlling a communication current. More specifically, the photocoupler 120 passes a communication current through the transmission path while the output from the transmission control unit 151 is at a H level, and passes no communication current through the transmission path while the output of the transmission control unit 151 is at a L level. In other words, while the output from the transmission control unit 151 is at a H level, a current flows through the light emitting diode 121 and a current flows through the phototransistor 122. In contrast, while the output from the transmission control unit 151 is at a L level, no current flows through the light emitting diode 121 and no current flows through the phototransistor 122. For example, a H-level voltage is 5 V and a L-level voltage is 0 V.

The photocoupler 140 has substantially the same structure as the photocoupler 120. The photocoupler 140 includes the light emitting diode 141 and a phototransistor 142. When a current flows through the light emitting diode 141, a current flows through the current path of the phototransistor 142. The light emitting diode 141 is arranged on the transmission path. The phototransistor 142 has the collector that is a reception terminal connected to a reception control unit 152, and is connected to the power terminal 171 via the resistor 144. The phototransistor 142 has the emitter connected to the ground terminal 182.

The resistor 143 is connected between the ends of the light emitting diode 141. The resistor 143 bypasses a noise current flowing toward the light emitting diode 141. More specifically, a noise current does not flow through the light emitting diode 141 but flows through the resistor 143. The resistor 144 and the resistor 145 are load resistors for the phototransistor 142. The resistor 145 has one end connected to the reception terminal, and the other end connected to the power terminal 171 via the transistor 146. Thus, the load resistance for the phototransistor 142 is switched in accordance with the state of the transistor 146. The transistor 146 is a positive-negative-positive (PNP) transistor. The state of the transistor 146 is switched in accordance with the level of a switch signal fed from a switch control unit 153 to the base of the transistor 146. More specifically, a H-level switch signal turns the transistor 146 into the nonconducting state, and a L-level switch signal turns the transistor 146 into the conducting state.

The operation of the photocoupler 140 will now be described briefly. When a communication current flows through the transmission path, a current flows through the light emitting diode 141, and the photocoupler 140 is turned on. Then, a current flows from the power terminal 171 to the ground terminal 182 via the phototransistor 142 and the resistor 144. Thus, the voltage drops across the resistor 144, leaving the reception terminal 195 at a L level. In contrast, when no communication current flows through the transmission path, no current flows through the light emitting diode 141, and the photocoupler 140 is turned off. Then, no voltage drops across the resistor 144, leaving the reception terminal 195 at a H level. The resistance value between the power terminal 171 and the reception terminal 195 differs between when the transistor 146 is conducting and when the transistor 146 is nonconducting, and thus different voltages are applied to the reception terminal 195.

The controller 150 is a circuit that controls communication. For example, the controller 150 is a microcomputer. The controller 150 controls the state of the photocoupler 120 to transmit data to the communication device 200. The controller 150 detects the state of the photocoupler 140 and receives data from the communication device 200. The controller 150 also switches the current threshold for determining whether a communication current is flowing. The controller 150 includes, as functional units, the transmission control unit 151, the reception control unit 152, and the switch control unit 153. The transmission control unit 151 applies a H- or L-level voltage across the light emitting diode 121 via the resistor 123. The reception control unit 152 determines whether a voltage applied to the reception terminal is at a H level or a L level. The switch control unit 153 switches the state of the transistor 146 using the circuit parameters to switch the current threshold.

The resistor 161 is a limiting resistor (load resistor) that limits a communication current flowing through the transmission path in the communication device 100. The resistance of the resistor 161 is a circuit parameter. The diode 162 is a rectifier that allows a current to flow in one direction from the anode to the cathode. The diode 162 blocks a reverse current that may flow through the transmission path due to erroneous wiring.

The power terminal 171 and the power terminal 172 are power source terminals for a DC power source different from the DC power source 110 and insulated from the AC power source 10. The ground terminal 181, the ground terminal 182, and the ground terminal 183 are ground terminals for this DC power source. For example, a voltage of 5 V is applied to the power source terminals for this DC power source or a voltage of 0 V is applied to the power source terminals for this DC power source. Although not shown, the power terminal 171 and the power terminal 172 are interconnected, whereas the ground terminal 181, the ground terminal 182, and the ground terminal 183 are interconnected. The reception terminal 195 is a terminal that receives a voltage to be compared with the voltage threshold and having a level corresponding to received data.

The structure of the communication device 200 will now be described. As shown in FIG. 1, the communication device 200 includes an AC load 210, the photocoupler 220, a resistor 223, the photocoupler 240, a resistor 243, a resistor 244, a resistor 245, a transistor 246, a controller 250, a resistor 261, a diode 262, a power terminal 271, a power terminal 272, a ground terminal 281, a ground terminal 282, and a ground terminal 283. The communication device 200 has substantially the same structure as the communication device 100 except that the DC power source 110 is replaced with the AC load 210.

The AC load 210 is a load that operates on AC power. The AC load 210 operates on AC power fed from the AC power source 10 through the power source line 20 and the common line 30. Although not shown in FIG. 1, the communication device 100 may also include a component equivalent to the AC load 210.

The photocoupler 220 has substantially the same structure and function as the photocoupler 120. More specifically, the photocoupler 220 electrically insulates the circuit connected to the AC power source 10 and the transmission path from the circuit connected to the microcomputer that is the controller 250. The photocoupler 220 includes a light emitting diode 221 and a phototransistor 222. The light emitting diode 221 receives a current fed from a transmission control unit 251 via the resistor 223. The phototransistor 222 is arranged on the transmission path. The resistor 223 is a load resistor that limits a current flowing from the transmission control unit 251 to the light emitting diode 221. The photocoupler 120 transmits data by controlling a communication current.

The photocoupler 240 has substantially the same structure and function as the photocoupler 140. The photocoupler 240 includes a light emitting diode 241 and a phototransistor 242. The light emitting diode 241 is arranged on the transmission path. The phototransistor 242 has the collector that is a reception terminal (not shown) connected to a reception control unit 252 and is connected to the power terminal 271 via the resistor 244. The phototransistor 242 has the emitter connected to the ground terminal 282.

The resistor 243 is connected between the ends of the light emitting diode 241. The resistor 243 bypasses a noise current flowing toward the light emitting diode 241. The resistor 244 and the resistor 245 are load resistors for the phototransistor 242. The load resistance for the phototransistor 242 is switched in accordance with the state of the transistor 246. The state of the transistor 246 is switched in accordance with the level of a switch signal fed from a switch control unit 253 to the base of the transistor 246.

The controller 250 is a circuit that controls communication. For example, the controller 250 is a microcomputer. The controller 250 controls the photocoupler 220 to transmit data to the communication device 100. The controller 250 detects the state of the photocoupler 240 and receives data from the communication device 100. The controller 250 also switches the current threshold for determining whether a communication current is flowing. The controller 250 includes, as functional units, the transmission control unit 251, the reception control unit 252, and the switch control unit 253. The transmission control unit 251 applies a H- or L-level voltage across the light emitting diode 221 via the resistor 223. The reception control unit 252 determines whether a voltage applied to the reception terminal is at a H level or a L level. The switch control unit 253 switches the state of the transistor 246 using the circuit parameters to switch the current threshold.

The resistor 261 is a limiting resistor (load resistor) that limits a communication current flowing through the transmission path in the communication device 200. The resistance value of the resistor 261 is a circuit parameter. The diode 262 is a rectifier that allows a current to flow in one direction from the anode to the cathode. The diode 262 blocks a reverse current that may flow through the transmission path due to erroneous wiring. The power terminal 271 and the power terminal 272 are power source terminals for a DC power source insulated from the AC power source 10. The ground terminal 281, the ground terminal 282, and the ground terminal 283 are ground terminals for this DC power source. Although not shown, the power terminal 271 and the power terminal 272 are interconnected, whereas the ground terminal 281, the ground terminal 282, and the ground terminal 283 are interconnected.

Switching the current threshold will now be described with reference to FIG. 2. The current threshold is switched in substantially the same manner between the communication device 100 and the communication device 200. Thus, the mechanism of switching the current threshold in the communication device 100 will be described below.

The communication current to flow through the transmission path is first determined using the circuit parameters. More specifically, the circuit parameters are the power source voltage of the DC power source 110, the resistance of the resistor 161, and the resistance of the resistor 261. In this example, the controller 150 stores the circuit parameters associated with the communication device 100 (the power source voltage of the DC power source 110 and the resistance of the resistor 161), whereas the controller 250 stores the circuit parameters associated with the communication device 200 (the resistance of the resistor 261). In this case, the controller 150 receives the circuit parameters associated with the communication device 200 from the controller 250. The controller 250 receives the circuit parameters associated with the communication device 100 from the controller 150.

With positive voltage noise and negative voltage noise both likely to occur, the positive noise margin and the negative noise margin are to be balanced evenly. Typically, the positive noise margin is to be the same as the negative noise margin. More specifically, the current threshold may be about half the communication current during the on-control period determined using the circuit parameters. Thus, the current threshold may be increased for a higher communication current during the on-control period, whereas the current threshold may be reduced for a lower communication current during the on-control period.

In the present embodiment, a L-level voltage is applied to the reception terminal 195 when a communication current flows, and a H-level voltage is applied to the reception terminal 195 when no communication current flows. For a large communication current during the on-control period, a lower voltage tends to be applied to the reception terminal and determined to be at a L level, and a communication current is easily determined to be flowing. In contrast, for a small communication current during the on-control period, a higher voltage tends to be applied to the reception terminal and determined to be at a H level, and a communication current is easily determined to be stopped.

Thus, for a larger communication current during the on-control period, the highest allowable voltage is applied to the reception terminal 195. More specifically, for a larger communication current during the on-control period, the transistor 146 is turned into the conducting state to reduce the resistance between the power terminal 171 and the reception terminal 195. In contrast, for a smaller communication current during the on-control period, the lowest allowable voltage is applied to the reception terminal 195. More specifically, for a smaller communication current during the on-control period, the transistor 146 is turned into the nonconducting state to increase the resistance of the load resistor (pull-up resistor) for the phototransistor 142, or more specifically, the resistance between the power terminal 171 and the reception terminal 195.

A decrease in the load resistance for the phototransistor 142 increases the emitter-collector voltage of the phototransistor 142, or increases the voltage applied to the reception terminal 195. In contrast, an increase in the load resistance for the phototransistor 142 decreases the emitter-collector voltage of the phototransistor 142, or decreases the voltage applied to the reception terminal 195. The voltage threshold used to determine the level of the voltage applied to the reception terminal 195 by the reception control unit 152 is constant. Thus, for the same communication current during the on-control period, the reception control unit 152 can more easily determine the voltage to be at a H level with decreasing load resistance for the phototransistor 142.

Figure 2:
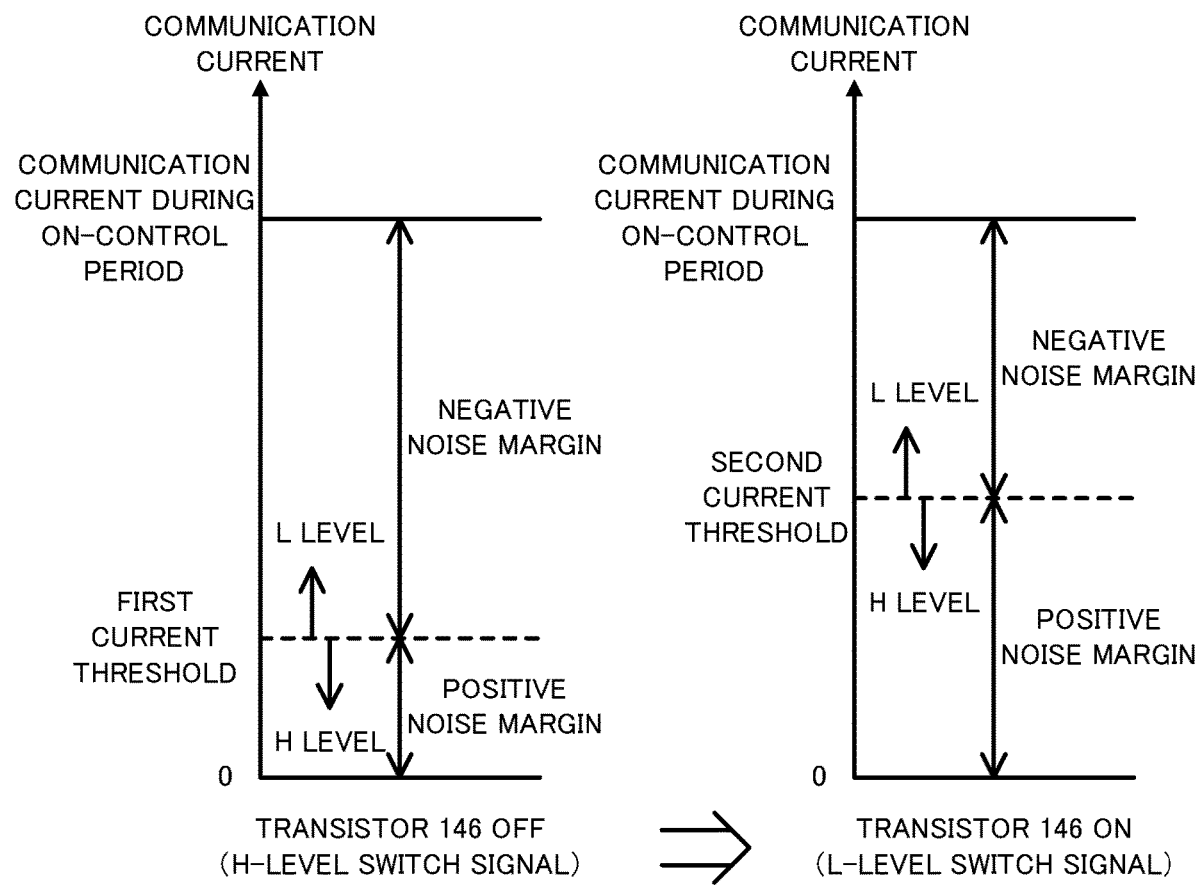
FIG. 2 is a diagram describing switching of current thresholds.

The left half of FIG. 2 shows the off-state of the transistor 146 and the current threshold that is a first current threshold much smaller than a communication current intensity during the on-control period. In this state, the negative noise margin is large enough, but the positive noise margin is small. When, for example, positive voltage noise occurs with no communication current flowing, the reception terminal 195 may be set at a L level and a communication current may be erroneously determined to be flowing.

As the right half of FIG. 2 shows, the transistor 146 may be turned on to switch the current threshold to a second current threshold greater than the first current threshold and about half the communication current intensity during the on-control period. In this state, both the positive and negative noise margins are relatively large. Although, for example, positive voltage noise occurs with no communication current flowing, the reception terminal 195 is maintained at a H level and a communication current is not erroneously determined to be flowing. In contrast, when negative voltage noise occurs with a communication current flowing, the reception terminal 195 is maintained at a L level and a communication current is not erroneously determined to be stopped.

Figure 3:
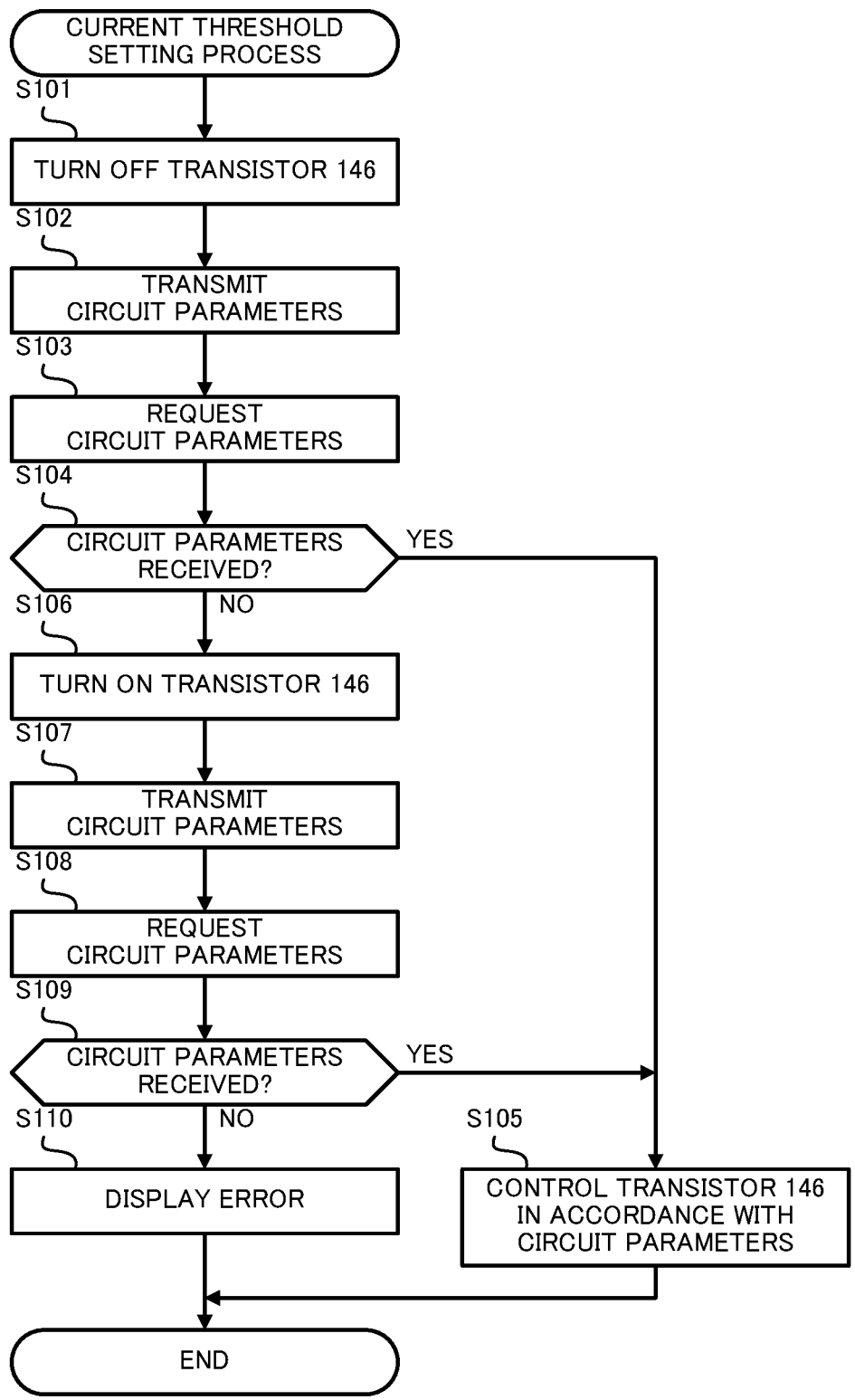
FIG. 3 is a flowchart showing a current threshold setting process performed by a reception device according to Embodiment 1 of the present disclosure.
Figure 4:
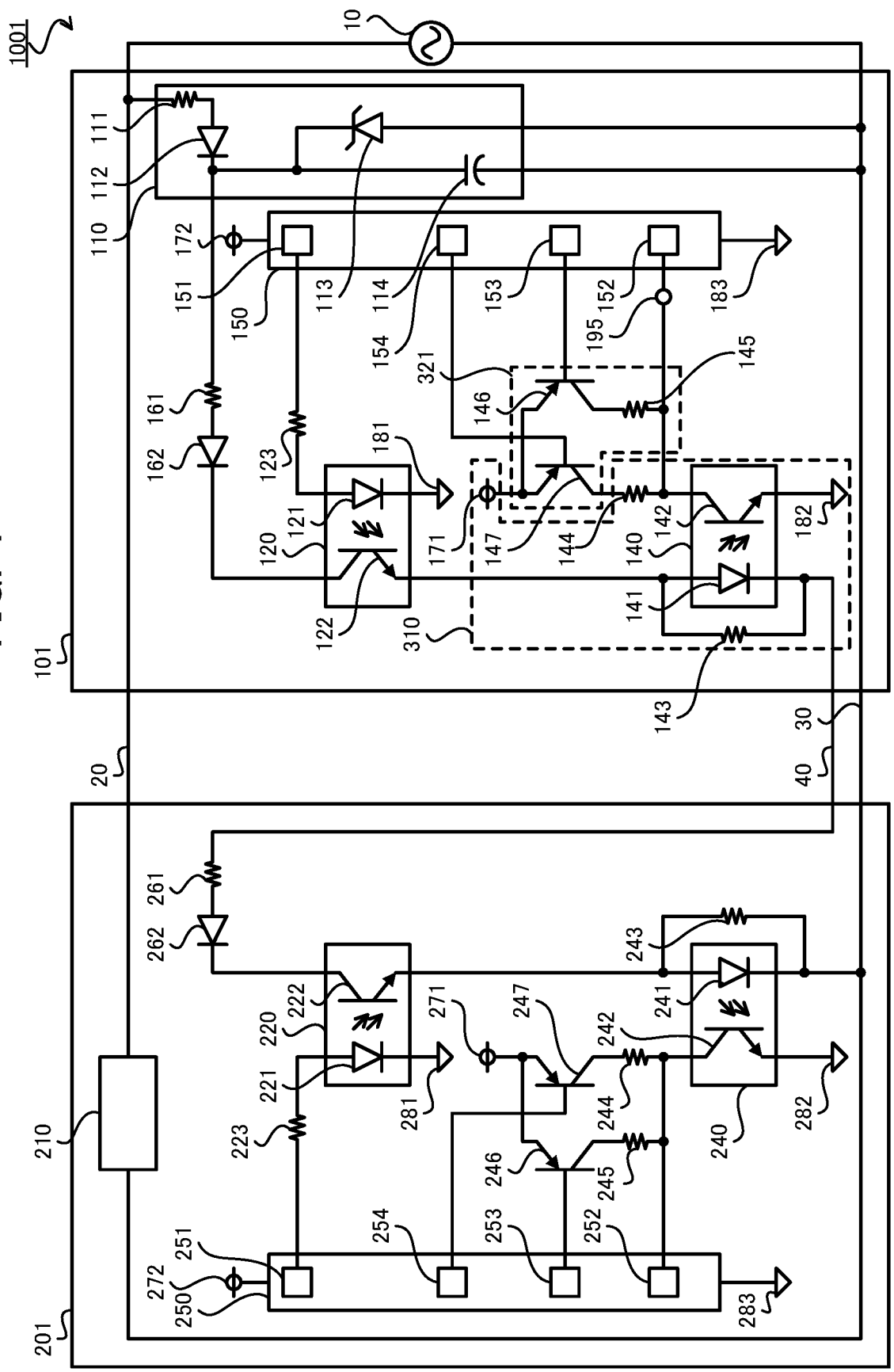
FIG. 4 is a schematic diagram of a communication system according to Embodiment 2 of the present disclosure.

The current threshold setting process performed by the communication device 100 will now be described with reference to FIG. 3. In the present embodiment, the communication device 100 communicates with the communication device 200 based on a master-slave system with the communication device 100 as an outdoor unit that serves as a master and the communication device 200 as an indoor unit that serves as a slave. The communication device 100 and the communication device 200 communicate with each other using commands that can be error-checked by the Federal Communication Commission (FCC). The communication device 100 sets a current threshold when powered.

The controller 150 first turns off the transistor 146 (step S101). More specifically, the switch control unit 153 applies a H-level voltage to the base of the transistor 146. In this case, the current threshold is set at the first current threshold smaller than the second current threshold. After completing the processing in step S101, the controller 150 transmits the circuit parameters (step S102). For example, the transmission control unit 151 controls the state of the photocoupler 120 to transmit, to the communication device 200, a command carrying data indicating the power source voltage of the DC power source 110 and the resistance of the resistor 161. The transmission control unit 151 may transmit the command multiple times.

After completing the processing in step S102, the controller 150 requests circuit parameters (step S103). For example, the transmission control unit 151 controls the state of the photocoupler 120 to transmit a command carrying data that requests the resistance of the resistor 261 to the communication device 200. The transmission control unit 151 may transmit the command multiple times. After completing the processing in step S103, the controller 150 determines whether the circuit parameters have been received (step S104). For example, the reception control unit 152 monitors the state of the photocoupler 140 to determine whether a command carrying data indicating the resistance of the resistor 261 has been received from the communication device 200.

The controller 150 that has determined the reception of the circuit parameters (Yes in step S104), for example, at least one reception of the above command, controls the transistor 146 using the circuit parameters (step S105). For example, the switch control unit 153 controls the conducting state of the transistor 146 based on the circuit parameters (the power source voltage of the DC power source 110, the resistance value of the resistor 161, and the resistance value of the resistor 261) to maximize the minimum value in the positive noise margin and the negative noise margin. After completing the processing in step S105, the controller 150 completes the current threshold setting process.

The controller 150 that has determined the reception of no circuit parameter (No in step S104), for example, a reception timeout without receiving any command, turns on the transistor 146 (step S106). More specifically, the switch unit control unit 153 applies a L-level voltage to the base of the transistor 146. In this case, the current threshold is set at the second current threshold greater than the first current threshold. After completing the processing in step S106, the controller 150 transmits the circuit parameters (step S107). For example, the transmission control unit 151 transmits the above command multiple times.

After completing the processing in step S107, the controller 150 requests circuit parameters (step S108). For example, the transmission control unit 151 transmits the above command multiple times. After completing the processing in step S108, the controller 150 determines whether the circuit parameters have been received (step S109). The controller 150 that has determined the reception of the circuit parameters (Yes in step S109), for example, at least one reception of the above command, controls the transistor 146 using the circuit parameters (step S105). After completing the processing in step S105, the controller 150 completes the current threshold setting process.

The controller 150 that has determined the reception of no circuit parameter (No in step S109), for example, a reception timeout without receiving any command, displays an error (step S110). More specifically, in response to unsuccessful communication at any of the first current threshold and the second current threshold, the user is notified that the system has an error. After completing the processing in step S110, the controller 150 completes the current threshold setting process.

The current threshold setting process performed by the communication device 200 substantially corresponds to the current threshold setting process performed by the communication device 100. For example, the controller 250 turns off the transistor 246 and waits for the communication device 100 to transmit a command carrying the circuit parameters. The controller 250 then receives the command carrying the circuit parameters from the communication device 100. The controller 250 also waits for the communication device 100 to transmit a command requesting circuit parameters. In response to the request command for the circuit parameters from the communication device 100, the controller 250 transmits the circuit parameters to the communication device 100.

Without the reception of the command carrying the circuit parameters or the request command for circuit parameters from the communication device 100, the controller 250 turns on the transistor 246 to repeat the same processing. In response to the reception of the command carrying the circuit parameters at one of the current thresholds, the controller 250 controls the state of the transistor 246 using the circuit parameters. In contrast, without receiving the command carrying the circuit parameters at any of the current thresholds, the controller 250 displays an error.

In the present embodiment, the voltage adjustment circuit is controlled in accordance with the communication current intensity during the on-control period to switch the current threshold for determining whether a communication current is flowing. Thus, the present embodiment improves the noise resistance.

The photocoupler 140, the resistor 143, the resistor 144, the power terminal 171, and the ground terminal 182 form a voltage application circuit 310. The reception control unit 152 corresponds to determination means. The resistor 145 and the transistor 146 form a voltage adjustment circuit 320. The switch control unit 153 corresponds to threshold switch means. The ground terminal 182 corresponds to a first terminal. The power terminal 171 corresponds to a second terminal. The resistor 144 corresponds to a first resistor. The resistor 145 corresponds to a second resistor. The transistor 146 corresponds to a first switching element. The controller 150 corresponds to data obtaining means.

The photocoupler 240, the resistor 243, the resistor 244, the power terminal 271, and the ground terminal 282 form a voltage application circuit. The reception control unit 252 corresponds to determination means. The resistor 245 and the transistor 246 form a voltage adjustment circuit. The switch control unit 253 corresponds to threshold switch means. The ground terminal 282 corresponds to a first terminal. The power terminal 271 corresponds to a second terminal. The resistor 244 corresponds to a first resistor. The resistor 245 corresponds to a second resistor. The transistor 246 corresponds to a first switching element. The controller 250 corresponds to data obtaining means.

Embodiment 2

In Embodiment 1, the current threshold is switched between two values, the first current threshold and the second current threshold. In the present disclosure, the current threshold may be switched between three or more values. In the present embodiment described below, the threshold current is switched between a first current threshold, a second current threshold, and a third current threshold.

A communication system 1001 according to Embodiment 2 includes a communication device 101 and a communication device 201. The communication device 101 is the same as the communication device 100 except that a transistor 147 is provided between the resistor 144 and the power terminal 171, and the controller 150 includes a switch control unit 154 that switches the conducting state of the transistor 147. The communication device 201 is the same as the communication device 200 except that a transistor 247 is provided between the resistor 244 and the power terminal 271, and the controller 250 includes a switch control unit 254 that switches the conducting state of the transistor 247. The communication device 101 will be described below.

The transistor 147 has the emitter connected to one end of the resistor 144, the collector to the power terminal 171, and the base to the switch control unit 154. The switch control unit 154 outputs a second switch signal to the base of the transistor 147. The switch control unit 153 outputs a first switch signal to the base of the transistor 146. FIG. 5 shows the relationship between the current threshold, the first switch signal, and the second switch signal.

For the first switch signal at a L level and the second switch signal at a H level, the resistor 145 serves as the pull-up resistor (the load resistor for the phototransistor 142), and the current threshold is the first current threshold. For the first switch signal at a H level and the second switch signal at a L level, the resistor 144 serves as the pull-up resistor, and the current threshold is the second current threshold. For the first switch signal at a L level and the second switch signal at a L level, the parallel resistors of the resistor 144 and the resistor 145 serve as the pull-up resistor, and the current threshold is the third current threshold. With the resistor 144 having a resistance greater than the resistance of the resistor 145, the second current threshold is greater than the first current threshold and smaller than the third current threshold. The switch control unit 153 and the switch control unit 154 determine the optimum current threshold among the first current threshold, the second current threshold, and the third current threshold in accordance with the communication current during the on-control period associated with the circuit parameters, and control the transistor 146 and the transistor 147.

In Embodiment 1, the current threshold is set to maximize the minimum value in the positive noise margin and the negative noise margin. However, positive noise and negative noise may have different incidences. In this case, the positive noise margin and the negative noise margin may be adjusted in accordance with the incidences of noise. For example, with the incidence of positive noise higher than the incidence of negative noise, the current threshold is set for the positive noise margin to be larger than the negative noise margin. The incidence of noise can be determined by the controller 150 based on the circuit parameters.

In the present embodiment, the current threshold is switched between the three values. Thus, the present embodiment can further improve the noise resistance. The resistor 145, the transistor 146, and the transistor 147 form a voltage adjustment circuit 321. The resistor 145 corresponds to a second resistor. The transistor 147 corresponds to a second switching element. The switch control unit 153 and the switch control unit 154 form threshold switch means. The resistor 245, the transistor 246, and the transistor 247 form a voltage adjustment circuit. The resistor 245 corresponds to a second resistor. The transistor 247 corresponds to a second switching element. The switch control unit 253 and the switch control unit 254 form threshold switch means.

Embodiment 3

In Embodiment 1, the current threshold is switched by switching the resistance between the reception terminal 195 and the power terminal 171. In the present disclosure, the current threshold may be switched using other techniques. In the present embodiment, a technique will be described for switching the resistance across the light emitting diode 141 to switch the current threshold.

Figure 6:
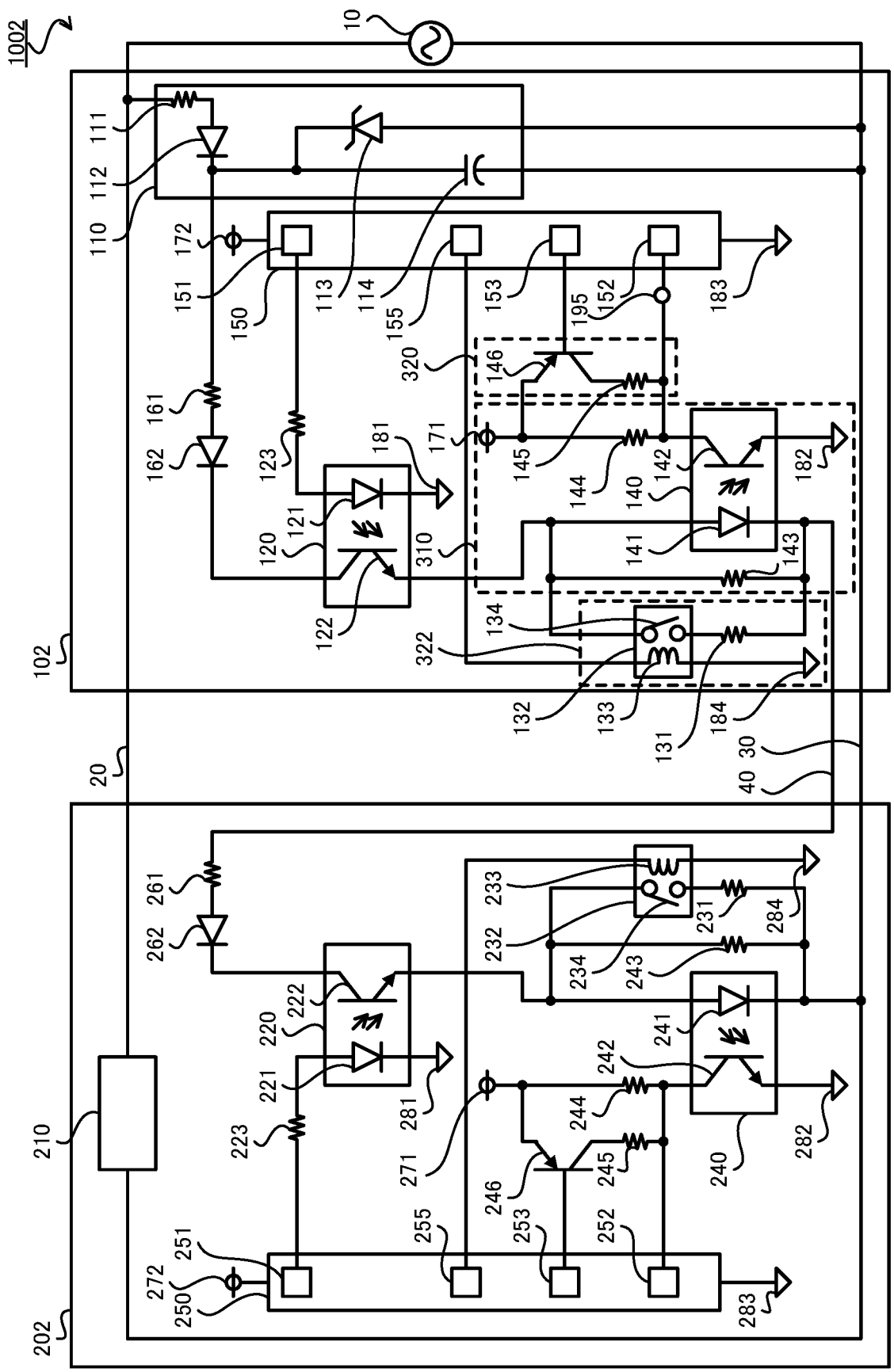
FIG. 6 is a schematic diagram of a communication system according to Embodiment 3 of the present disclosure.
Figure 7:
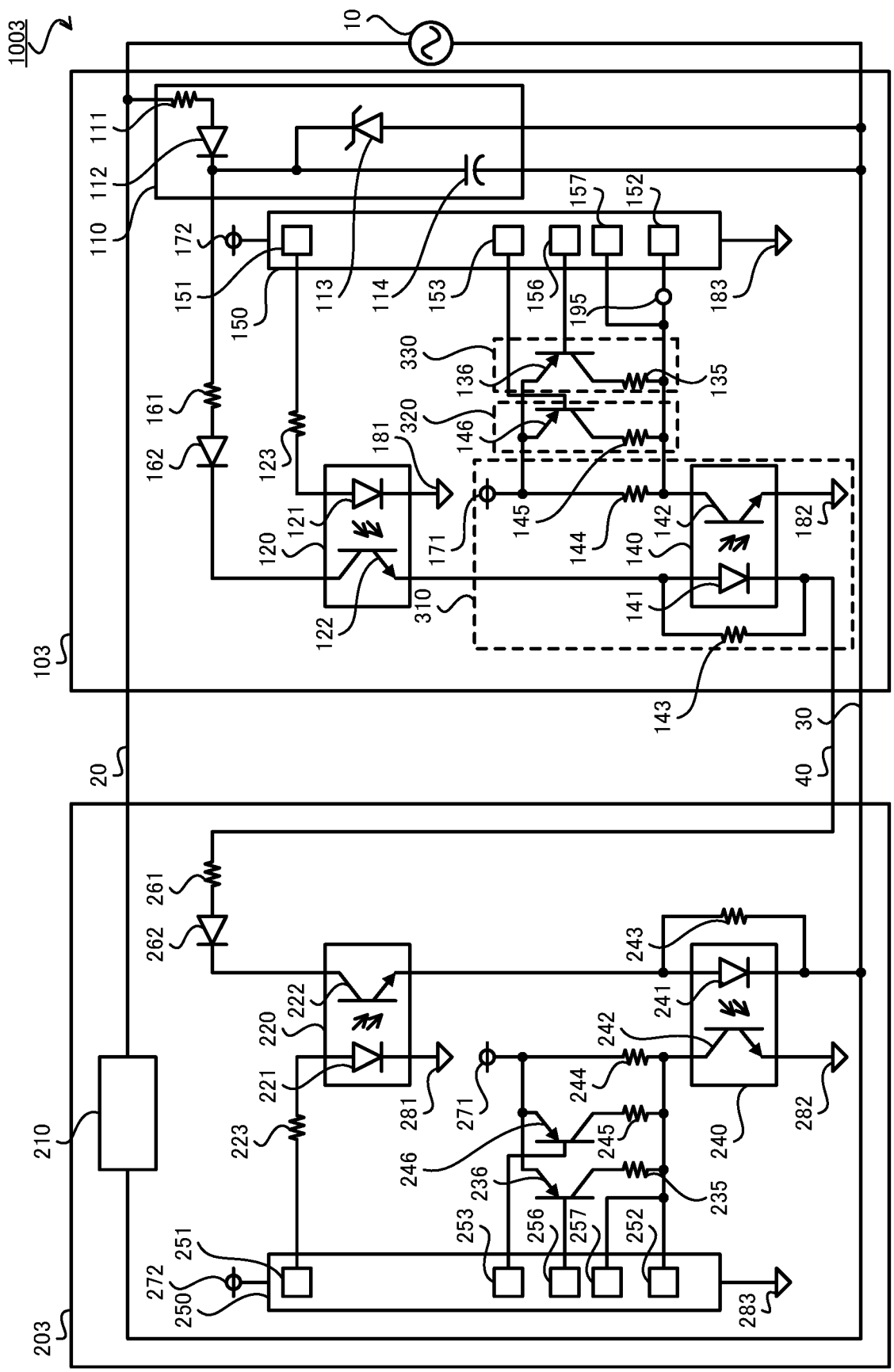
FIG. 7 is a schematic diagram of a communication system according to Embodiment 4 of the present disclosure.

As shown in FIG. 6, a communication system 1002 according to Embodiment 3 includes a communication device 102 and a communication device 202. The communication device 102 is the same as the communication device 100 except that a resistor 131 and a relay 132 are arranged in series between the ends of the light emitting diode 141, and the controller 150 includes a switch control unit 155 that controls the state of the relay 132. The communication device 202 is the same as the communication device 200 except that a resistor 231 and a relay 232 are arranged in series between the ends of the light emitting diode 241, and the controller 250 includes a switch control unit 255 that controls the state of the relay 232. The communication device 102 will be described below.

The relay 132 includes a coil 133 through which a supplied current flows and a switch 134 turned on when a current flows through the coil 133 and turned off when no current flows through the coil 133. The coil 133 receives a current fed from the switch control unit 155. The switch 134 is connected between one end of the resistor 131 and the anode of the light emitting diode 141. The other end of the resistor 131 is connected to the cathode of the light emitting diode 141. Like the resistor 143, the resistor 131 bypasses a noise current flowing toward the light emitting diode 141 to prevent the noise current from flowing into the light emitting diode 141.

When a current flows through the switch 134, a communication current also flows through the resistor 131. In this case, the amount of apparent communication current decreases, and the current threshold increases. The switch control unit 155 controls the conducting state of the relay 132 using the circuit parameters to achieve an appropriate current threshold.

In the present embodiment, the resistance across the light emitting diode 141 is switched to switch the current threshold. Thus, the present embodiment is expected to improve the noise resistance. The resistor 131 and the relay 132 form a voltage adjustment circuit 322. The switch control unit 155 corresponds to threshold switch means. The switch control unit 155 corresponds to threshold switch means. The resistor 143 corresponds to a third resistor. The resistor 131 corresponds to a fourth resistor. The resistor 231 and the relay 232 form a voltage adjustment circuit. The switch control unit 255 corresponds to threshold switch means. The switch control unit 253 and the switch control unit 255 form threshold switch means. The resistor 243 corresponds to a third resistor. The resistor 231 corresponds to a fourth resistor.

In the present embodiment, the switch control unit 153 does not function as threshold switch means. The switch control unit 153 may also function as threshold switch means as in Embodiment 1. In this case, the current threshold is set by the switch control unit 153 controlling the voltage adjustment circuit 320 and the switch control unit 155 controlling the voltage adjustment circuit 322. Without controlled by the switch control unit 153, the communication device 102 may eliminate the resistor 145, the transistor 146, and the switch control unit 153. The same applies to the communication device 202.

Embodiment 4

In Embodiment 1, the communication current intensity during the on-control period is identified based on the circuit parameters obtained via communication. In the present disclosure, the communication current intensity during the on-control period may be identified using other techniques. The present embodiment describes a technique for identifying the communication current intensity during the on-control period by measuring the communication current.

A communication system 1003 according to Embodiment 4 includes a communication device 103 and a communication device 203. The communication device 103 is the same as the communication device 100 except that the communication device 103 includes a resistor 135 and a transistor 136, and the controller 150 includes a switch control unit 156 and an AD converter 157. The communication device 203 is the same as the communication device 200 except that the communication device 203 includes a resistor 235 and a transistor 236, and the controller 250 includes a switch control unit 256 and an AD converter 257. The communication device 103 will be described below.

The resistor 135 is connected between the emitter of the transistor 136 and the reception terminal 195. The transistor 136 has the collector connected to the power terminal 171, and the base to the switch control unit 156. The AD converter 157 is connected to the reception terminal 195. The resistor 135 has a very low value smaller than the value of the resistor 144 and the value of the resistor 145. Thus, while the switch control unit 156 is controlling the transistor 136 in the on-state, the photocoupler 140 works in the active region. In this case, the voltage applied to the reception terminal 195 is proportional to the communication current. More specifically, to measure the communication current, the controller 150 causes the photocoupler 140 to work in the active region, and obtains the voltage applied to the reception terminal 195 through the AD converter 157. This allows the controller 150 to easily calculate the communication current during the on-control period based on the value resulting from AD conversion.

In this manner, the resistor 135 causes the photocoupler 140 to work in the active region to measure the communication current. When the photocoupler 140 works in the active region, a change in the communication current is easily represented as a change in the received voltage (voltage applied to the reception terminal 195). For data communication (when no communication current is measured), the resistance of the load resistor for the phototransistor 142 is intended to be large enough for the phototransistor 142 to saturate when a communication current flows. Thus, the transistor 136 is turned off for data communication, and the transistor 136 is turned on for measuring the communication current.

Figure 8:
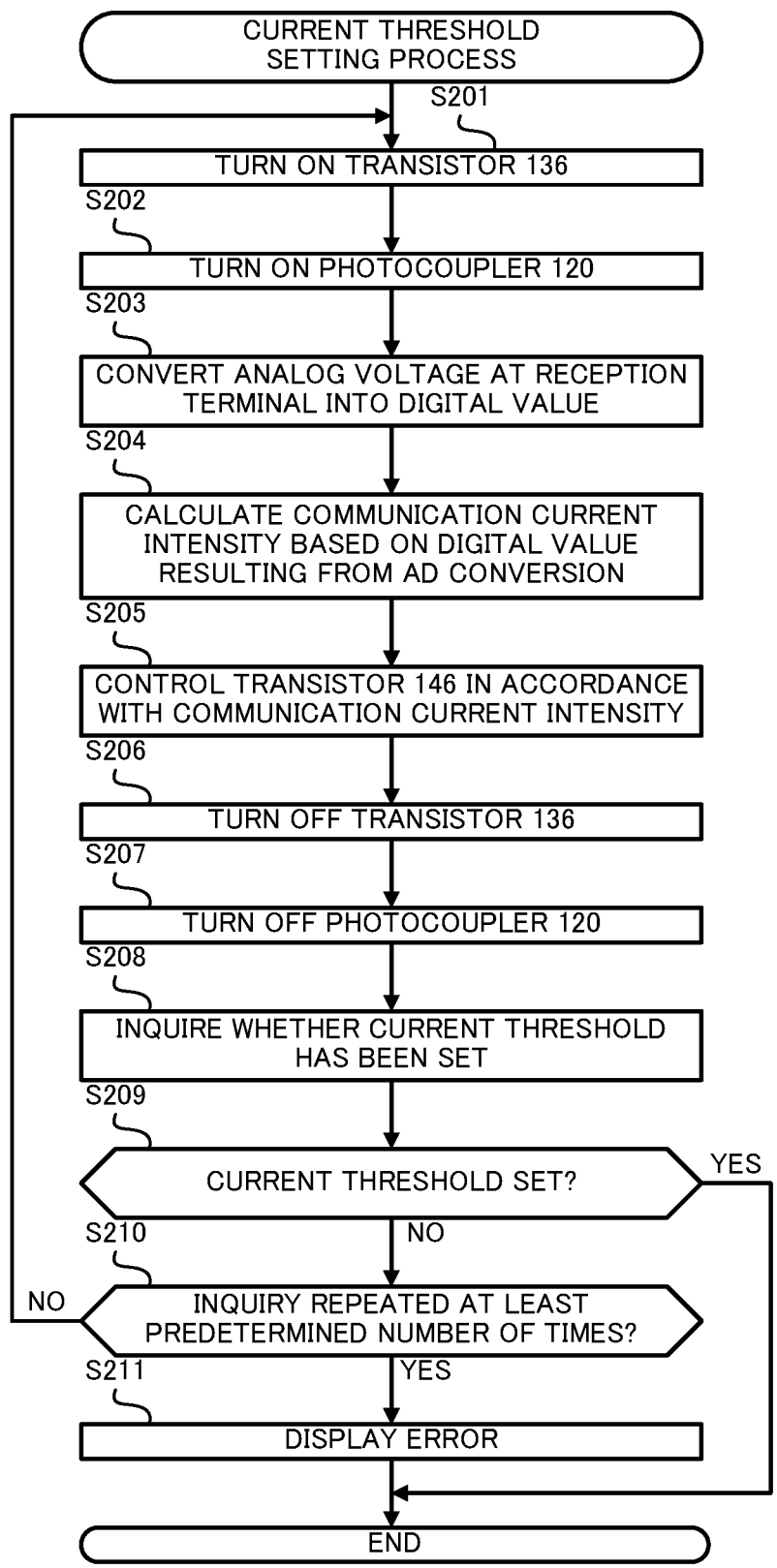
FIG. 8 is a flowchart showing a current threshold setting process performed by a reception device according to Embodiment 4 of the present disclosure.
Figure 9:
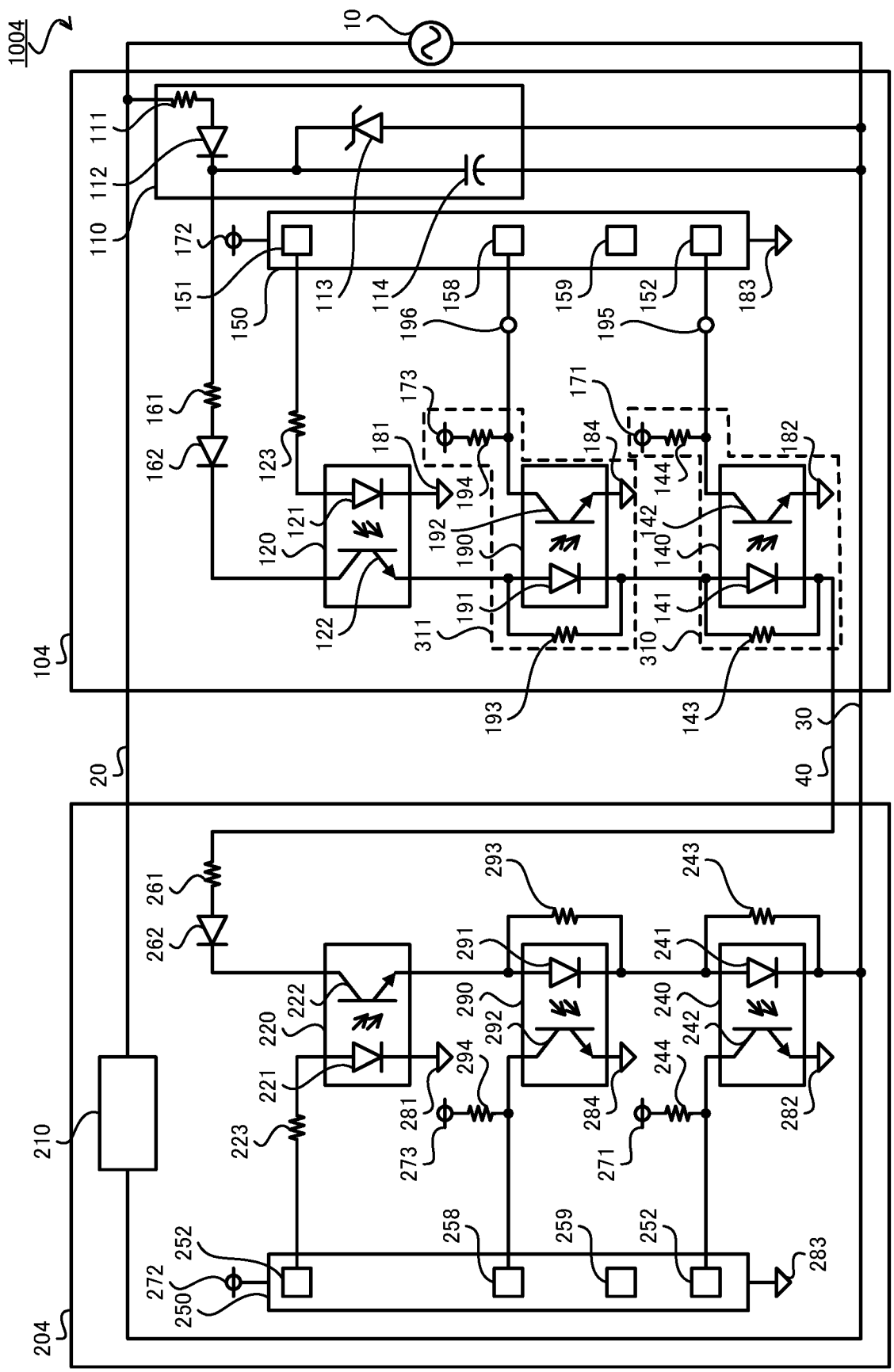
FIG. 9 is a schematic diagram of a communication system according to Embodiment 5 of the present disclosure.

The current threshold setting process performed by the communication device 103 will now be described with reference to FIG. 8. The communication device 103 sets a current threshold when powered.

The controller 150 first turns on the transistor 136 (step S201). For example, the switch control unit 156 applies an L-level voltage to the base of the transistor 136, causing the photocoupler 140 to work in the active region. After completing the processing in step S201, the controller 150 turns on the photocoupler 120 (step S202). For example, the transmission control unit 151 feeds a current to the light emitting diode 121 to turn on the photocoupler 120. Also in the communication device 203, a communication current flows through the transmission path to turn on the photocoupler 220.

After completing the processing in step S202, the controller 150 converts the analog voltage at the reception terminal 195 into a digital value (step S203). For example, the AD converter 157 starts measuring the voltage at the reception terminal 195. After completing the processing in step S203, the controller 150 calculates the communication current intensity based on the digital value resulting from the AD conversion (step S204). For example, the controller 150 calculates the communication current intensity by subtracting the digital value from a predetermined numerical value (e.g., 5 V) and multiplying the resultant numerical value by a predetermined constant of proportionality. To eliminate the influence of noise, the controller 150 may use the average of the values resulting from AD conversion during a predetermined period.

After completing the processing in step S204, the controller 150 controls the transistor 146 in accordance with the communication current intensity (step S205). More specifically, the switch control unit 153 turns on or off the transistor 146 to achieve an appropriate current threshold in accordance with the communication current intensity. After completing the processing in step S205, the controller 150 turns off the transistor 136 (step S206). After completing the processing in step S206, the controller 150 turns off the photocoupler 120 (step S207).

After completing the processing in step S207, the controller 150 transmits an inquiry to the communication device 203 as to whether a current threshold has been set (step S208). More specifically, the transmission control unit 151 transmits, to the communication device 203 via the photocoupler 120, a command carrying data that inquires whether a current threshold has been set. The controller 150 then receives a command carrying data indicating whether the current threshold has been set from the communication device 203. After completing the processing in step S208, the controller 150 determines whether the current threshold has been set (step S209). The controller 150 that has determined the completion of the current threshold setting by the communication device 203 (Yes in step S209) completes the current threshold setting process. The controller 150 determines whether the communication device 203 has set a current threshold based on the response command received from the communication device 203.

In contrast, the controller 150 that has determined the incompletion of the current threshold setting by the communication device 203 (No in step S209) determines whether the inquiry has been repeated at least a predetermined number of times (step S210). The controller 150 that has determined that the inquiry has not been repeated at least the predetermined number of times (No in step S210) returns the processing to step S201. In contrast, the controller 150 that has determined that the inquiry has been repeated at least the predetermined number of times (Yes in step S210) displays an error (step S211). After completing the processing in step S211, the controller 150 completes the current threshold setting process.

The current threshold setting process performed by the communication device 203 substantially corresponds to the current threshold setting process performed by the communication device 103. More specifically, the communication device 203 turns on the transistor 236 and the photocoupler 220 and converts the analog voltage at the reception terminal 195 into a digital value. The communication device 203 then calculates the communication current intensity based on the digital value resulting from the AD conversion, and controls the state of the transistor 246 based on the calculation result. The communication device 203 then turns the transistor 236 and the photocoupler 220 off. When the communication device 203 receives a command inquiring whether a current threshold has been set from the communication device 103, the communication device 203 completes the current threshold setting process. Without receiving this command from the communication device 103, the communication device 203 displays an error and then ends the current threshold setting process.

In the present embodiment, the communication current during the on-control period is measured, and the current threshold is set in accordance with the measured communication current. Thus, the present embodiment improves the noise resistance. The AD converter 157 corresponds to a voltage measurement circuit. The resistor 135 and the transistor 136 form a bypass circuit 330. The resistor 135 corresponds to a fifth resistor. The transistor 136 corresponds to a third switching element. The AD converter 257 corresponds to a voltage measurement circuit. The resistor 235 and the transistor 236 form a bypass circuit. The resistor 235 corresponds to a fifth resistor. The transistor 236 corresponds to a third switching element.

Embodiment 5

In Embodiment 1, the current threshold is switched by switching the voltage applied to the reception terminal 195. In the present disclosure, the current threshold may be switched using other techniques. The present embodiment describes a technique for switching current thresholds with two reception terminals to which different voltages are applied although a communication current flows with the same intensity. The switching is based on the voltage applied to one of the two reception terminals.

A communication system 1004 according to Embodiment 5 includes a communication device 104 and a communication device 204. The communication device 104 is the same as the communication device 100 except that the communication device 104 includes a reception control unit 158, a power terminal 173, a ground terminal 184, a photocoupler 190, a resistor 193, and a resistor 194, without the resistor 145, the transistor 146, or the switch control unit 153. The communication device 204 is the same as the communication device 200 except that the communication device 204 includes a reception control unit 258, a power terminal 273, a ground terminal 284, a photocoupler 290, a resistor 293, and a resistor 294, without the resistor 245, the transistor 246, or the switch control unit 253. The communication device 104 will be described below.

The photocoupler 190 is arranged on the transmission path, like the photocoupler 140. The photocoupler 190 includes a light emitting diode 191 and a phototransistor 192. The light emitting diode 191 has the anode connected to the emitter of the phototransistor 122, and the cathode to the anode of the light emitting diode 141. The phototransistor 192 has the emitter connected to the ground terminal 184, and the collector to a second reception terminal 196. The resistor 194 is arranged between the second reception terminal 196 and the power terminal 173. The second reception terminal 196 is connected to the reception control unit 158. The resistor 193 is arranged between the ends of the light emitting diode 191. A switch control unit 159 switches a reception control unit that receives data between the reception control unit 152 connected to the reception terminal 195 and the reception control unit 158 connected to the second reception terminal 196.

The combination of the resistances of the resistor 143 and the resistor 144 differs from the combination of the resistances of the resistor 193 and the resistor 194. More specifically, at least the resistor 143 and the resistor 193 have different resistances or the resistor 144 and the resistor 194 have different resistances. Thus, although a communication current with the same intensity flows through the transmission path, different voltages are applied to the reception terminal 195 connected to the reception control unit 152 and the second reception terminal 196 connected to the reception control unit 158. In other words, the current threshold varies between when the reception control unit 152 is used and when the reception control unit 158 is used.

Figure 10:
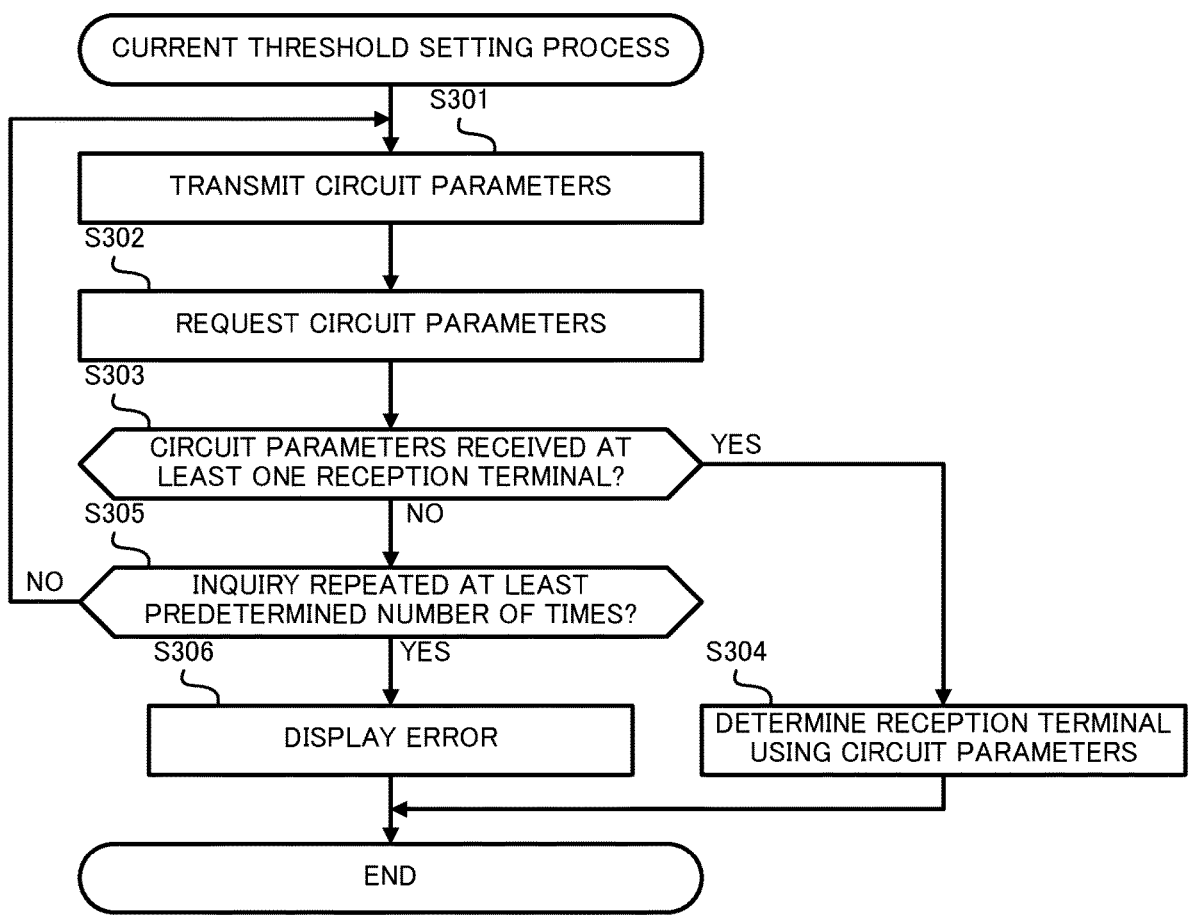
FIG. 10 is a flowchart showing a current threshold setting process performed by a reception device according to Embodiment 5 of the present disclosure.

The current threshold setting process performed by the communication device 104 will now be described with reference to FIG. 10. The communication device 104 sets a current threshold when powered.

The controller 150 first transmits the circuit parameters to the communication device 204 (step S301). For example, the transmission control unit 151 controls the photocoupler 120 to transmit, to the communication device 204, a command carrying data indicating the power source voltage of the DC power source 110 and the resistance of the resistor 161. After completing the processing in step S301, the controller 150 requests circuit parameters from the communication device 204 (step S302). For example, the transmission control unit 151 controls the photocoupler 120 to transmit a command carrying data that requests the resistance of the resistor 261 to the communication device 204.

After completing the processing in step S302, the controller 150 determines whether at least one of the reception terminals have received the circuit parameters (step S303). For example, the controller 150 determines whether any of the reception control unit 152 and the reception control unit 158 has successfully received the circuit parameter. The controller 150 that has determined the reception of the circuit parameters at least one reception terminal (Yes in step S303) determines the reception terminal using the circuit parameters (step S304). For example, the switch control unit 159 selects one of the reception control unit 152 and the reception control unit 158 for data reception in accordance with the received circuit parameters. After completing the processing in step S304, the controller 150 completes the current threshold setting process.

In contrast, the controller 150 that has determined the receipt of no circuit parameter at any reception terminal (No in step S303) determines whether the inquiry has been repeated at least a predetermined number of times (step S305). The controller 150 that has determined that the inquiry has not been repeated at least the predetermined number of times (No in step S305) returns the processing to step S301. In contrast, the controller 150 that has determined that the inquiry has been repeated at least a predetermined number of times (Yes in step S305) displays an error (step S306). After completing the processing in step S306, the controller 150 completes the current threshold setting process.

The current threshold setting process performed by the communication device 204 substantially corresponds to the current threshold setting process performed by the communication device 104. More specifically, the communication device 204 waits for a command carrying the circuit parameters associated with the communication device 104 and a command requesting circuit parameters associated with the communication device 204 transmitted from the communication device 104. The communication device 204 attempts to receive the commands at both the reception control unit 252 and the reception control unit 258. In response to the reception of the commands at least one of the reception control unit 252 and the reception control unit 258, the communication device 204 performs the processing associated with the commands.

For example, in response to the command carrying the circuit parameters associated with the communication device 104, the communication device 204 selects one of the reception control unit 252 and the reception control unit 258 based on the received circuit parameters. In response to the command requesting the circuit parameters associated with the communication device 204, the communication device 204 transmits, to the communication device 104, a command carrying the circuit parameters associated with the communication device 204. Without receiving the commands at any of the reception control unit 252 and the reception control unit 258, the communication device 204 displays an error and then ends the current threshold setting process.

In the present embodiment, the voltage to be compared with the voltage threshold is switched to one of the voltage applied to the reception terminal 195 and the voltage applied to the second reception terminal 196. Thus, the present embodiment improves the noise resistance. The photocoupler 190, the resistor 193, the resistor 194, the power terminal 173, and the ground terminal 184 form a voltage application circuit 311 corresponding to a second voltage application circuit. The reception control unit 152 and the reception control unit 158 form determination means. The switch control unit 159 corresponds to a voltage adjustment circuit and threshold switch means. The ground terminal 182 and the ground terminal 184 correspond to a first terminal. The reception terminal 196 corresponds to a second reception terminal. The power terminal 171 and the power terminal 173 correspond to a second terminal. The resistor 194 corresponds to a sixth resistor. The resistor 193 corresponds to a seventh resistor. The communication device 204 is the same as the communication device 104.

Modifications

The above embodiments of the present disclosure may be altered and modified variously to implement the disclosure.

In the present disclosure, the components, functions, and operations described in the above embodiments may be selectively used as appropriate. In the present disclosure, further components, functions, and operations may also be used other than the components, functions, and operations described above. The components, functions, and operations described in the above embodiments may be combined as appropriate.

In Embodiment 1, the present disclosure is implemented as a communication system that allows two-way communication between communication devices. In some embodiments, the present disclosure may be implemented as a communication system that allows one-way communication between communication devices. For example, such a communication system is a communication system including a monitoring device and a monitored device or a communication system including a controlling device and a controlled device. Also in such a communication system, the noise resistance is expected to be improved during current loop communication.

In Embodiment 1, the communication system 1000 is an air-conditioning system. More specifically, the communication device 100 is an outdoor unit, and the communication device 200 is an interior unit. The present disclosure is applicable systems other than air-conditioning systems. The present disclosure is applicable to a communication system including communication devices that are connected to each other through a power source line 20, a common line 30, and a communication line 40 and communicate with each other through serial communication through the common line 30 and the communication line 40. For example, the present disclosure is applicable to a lighting system including a lighting controller and a lighting apparatus.

Hardware other than described in Embodiments 1 to 5 may be used. For example, the transistor 146 may be a negative-positive-negative (NPN) transistor instead of a PNP transistor. The transistor 146 included in the voltage adjustment circuit 320 may be replaced with a field-effect transistor (FET) or a relay. Similarly, the relay 132 included in the voltage adjustment circuit 322 may be replaced with a transistor or a FET.

The functional components in the communication system may be in any other arrangement. For example, in Embodiment 1, the voltage adjustment circuit 320 may be included in the voltage application circuit 310. In Embodiment 5, the voltage application circuit 311 that is the second voltage application circuit may be regarded as a voltage adjustment circuit that adjusts the voltage that is applied to the reception terminal 195 by the voltage application circuit 310 and applies the adjusted voltage to the reception terminal 196.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to a communication system that communicates through a current loop.

The invention claimed is:

1. A reception device to be connected to a transmission device with a pair of communication lines included in a transmission path, the transmission device being for controlling a turning-on and turning-off of a communication current flowing through the transmission path, the reception device comprising:

a voltage application circuit configured to apply, to a reception terminal, a voltage corresponding to an intensity of the communication current;

a determiner configured to determine whether the communication current is flowing, by comparing the voltage applied to the reception terminal with a predetermined voltage threshold;

a voltage adjustment circuit configured to adjust the voltage that is applied to the reception terminal by the voltage application circuit; and a threshold switcher configured to switch a current threshold used for determining whether the communication current is flowing, by controlling the voltage adjustment circuit in accordance with an intensity of the communication current during an on-control period.

2. The reception device according to claim 1, wherein the voltage application circuit includes a photocoupler including a light emitting diode on the transmission path and a phototransistor between the reception terminal and a first terminal to which a first voltage is applied, and a first resistor between the reception terminal and a second terminal to which a second voltage that is different from the first voltage is applied, and the voltage adjustment circuit is located between the second terminal and the reception terminal and causes a resistance value between the second terminal and the reception terminal to be switched.

3. The reception device according to claim 2, wherein the voltage adjustment circuit includes a second resistor and a first switching element connected in series to the second resistor, and the threshold switcher switches a state of the first switching element in accordance with the intensity of the communication current during the on-control period.

4. The reception device according to claim 3, wherein the voltage adjustment circuit includes a second switching element between the second terminal and the reception terminal and in series to the first resistor, and the threshold switcher switches the state of the first switching element and a state of the second switching element in accordance with the intensity of the communication current during the on-control period.

5. The reception device according to claim 1, wherein the voltage application circuit includes a photocoupler including a light emitting diode on the transmission path and a phototransistor between the reception terminal and a first terminal to which a first voltage is applied, a first resistor between the reception terminal and a second terminal to which a second voltage that is different from the first voltage is applied, and a third resistor between ends of the light emitting diode, and the voltage adjustment circuit is located between the ends of the light emitting diode and causes a resistance value across the light emitting diode to be switched.

6. The reception device according to claim 5, wherein the voltage adjustment circuit includes a fourth resistor and a relay connected in series to the fourth resistor, and the threshold switcher switches a state of the relay in accordance with the intensity of the communication current during the on-control period.

7. The reception device according to claim 1, further comprising:

a data obtainer configured to obtain data transmitted from the transmission device, in accordance with a determination result from the determiner, wherein the threshold switcher determines the intensity of the communication current during the on-control period, based on the data obtained by the data obtainer.

8. The reception device according to claim 7, wherein the data obtained by the data obtainer indicates a resistance value of a current limiting resistor included in the transmission device on the transmission path, and the threshold switcher determines the intensity of the communication current during the on-control period, based on the resistance value of the current limiting resistor.

9. The reception device according to claim 7, wherein when the data obtainer is unable to properly obtain data with the current threshold switched to a first current threshold, the threshold switcher switches the current threshold to a second current threshold that is different from the first current threshold.

10. The reception device according to claim 1, further comprising:

a voltage measurement circuit configured to measure the voltage applied to the reception terminal, wherein the threshold switcher determines the intensity of the communication current during the on-control period, based on the voltage measured by the voltage measurement circuit during the on-control period.

11. The reception device according to claim 10, wherein the voltage application circuit includes a photocoupler including a light emitting diode on the transmission path and a phototransistor between the reception terminal and a first terminal to which a first voltage is applied, and a first resistor between the reception terminal and a second terminal to which a second voltage that is different from the first voltage is applied, the reception device further comprises a bypass circuit between the second terminal and the reception terminal, the bypass circuit including a fifth resistor having a resistance value smaller than a resistance value of the first resistor and a third switching element connected in series to the fifth resistor, and the threshold switcher determines the intensity of the communication current during the on-control period, based on a voltage measured by the voltage measurement circuit during the on-control period with the third switching element being in a conducting state.

12. The reception device according to claim 1, further comprising:

a second voltage application circuit configured to apply, to a second reception terminal, a voltage corresponding to the intensity of the communication current and different from the voltage applied to the reception terminal, wherein the determiner determines whether the communication current is flowing, by comparing the voltage threshold with the voltage applied to the reception terminal or the voltage applied to the second reception terminal, and the threshold switcher switches the voltage that is compared with the voltage threshold by the determiner to the voltage applied to the reception terminal or to the voltage applied to the second reception terminal.

13. The reception device according to claim 12, wherein the voltage application circuit includes a photocoupler including a light emitting diode on the transmission path and a phototransistor between the reception terminal and a first terminal to which a first voltage is applied, a first resistor between the reception terminal and a second terminal to which a second voltage that is different from the first voltage is applied, and a third resistor between ends of the light emitting diode, the second voltage application circuit includes a second photocoupler including a second light emitting diode on the transmission path and a second phototransistor between the first terminal and the second reception terminal, a sixth resistor between the second terminal and the second reception terminal, and a seventh resistor between ends of the second light emitting diode, and the first resistor has a resistance value that is different from a resistance value of the sixth resistor or the third resistor has a resistance value that is different from a resistance value of the seventh resistor.

14. A communication system, comprising:

a transmission device configured to control turning-on and turning-off of a communication current flowing through a transmission path including a pair of communication lines; and a reception device to be connected to the transmission device with the pair of communication lines, the reception device including a voltage application circuit configured to apply, to a reception terminal, a voltage corresponding to an intensity of the communication current, a determiner configured to determine whether the communication current is flowing, by comparing the voltage applied to the reception terminal with a predetermined voltage threshold, a voltage adjustment circuit configured to adjust the voltage that is applied to the reception terminal by the voltage application circuit, and a threshold switcher configured to switch a current threshold used for determining whether the communication current is flowing, by controlling the voltage adjustment circuit in accordance with an intensity of the communication current during an on-control period.

* * * * *